United States Patent Office 3,162,210
Patented Dec. 22, 1964

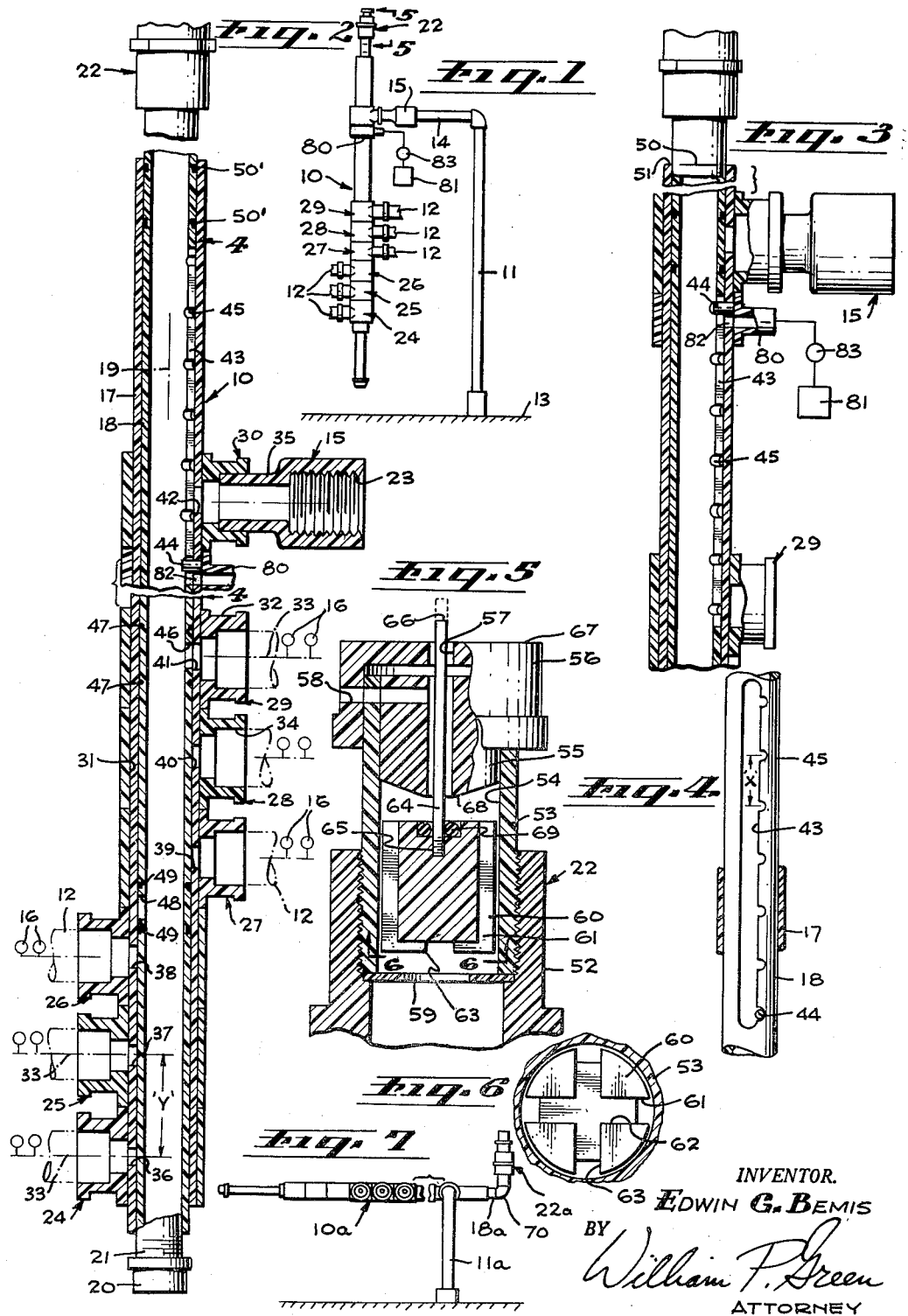

3,162,210
VALVE FOR SPRINKLER SYSTEMS OR THE LIKE
Edwin G. Bemis, 2601 Bruce Lane, La Habra, Calif.
Filed Aug. 24, 1961, Ser. No. 133,598
8 Claims. (Cl. 137—218)

This invention relates to an improved type of slide valve structure, which is in certain respects particularly desirable for use in controlling the delivery of water to the various branches of a lawn sprinkling system.

In conventional lawn sprinkling or watering systems, it is customary to provide a number of different branch lines leading to various different areas of the lawn or garden to be watered, with each such line containing a separate valve, so that the branches may be turned on and off separately as desired. In many installations, six, eight, or even more, of these separate lines and separate valves are required, to allow for adequate control of the overall watering system.

Such a multiple valve arrangement has certain decided disadvantages in that the provision of so many separate valves adds considerable to the cost of the installation, and also introduces more complexity than would be desired into the operation of the system. The home owner or operator must learn and remember the locations of all of the various valves in the system, as well as the areas controlled by the different valves. Further, besides the numerous valves and associated lines leading to the different areas, a conventional system of the discussed type must include an anti-siphon valve, connected into the system in advance of the branch lines, with the anti-siphon valve being designed to prevent back-flow of water in the event of development of reverse siphoning conditions.

A general object of the present invention is to provide a unique slide valve structure which is capable, in one unit, of performing the functions of an entire series of separate branch line valves of the type ordinarily employed in watering systems. A valve embodying the invention may include a single unitary body structure, to which a main water supply line and a number of branches of a sprinkler system are connected, with the delivery of water to those branches preferably being controlled by movement of a single slide element to any of a plurality of different positions. In one setting, the slide element may turn the water off to all of the branches, while in other settings the valve may emit water selectively to the different branches as desired. Preferably, the body and slide element of the valve are both formed of a resinous plastic material, desirably polyvinyl chloride, with these two parts typically taking the form essentially of two concentric tubes, one disposed about the other. The outer tube may have connector fittings formed integrally therewith, or mounted thereabout.

An additional and highly important feature of the invention has to do with a unique manner of incorporating an anti-siphon valve in the slide valve structure itself, so that a separate anti-siphon valve unit is not required. More particularly, I prefer to mount the anti-siphon valve to one of the two sections of the slide valve structure, and for best results to the slide element of that structure. It is found that the anti-siphon valve may conveniently be mounted to one end of the slide, at a location at which the anti-siphon valve may communicate readily with the atmosphere, to provide an anti-siphoning venting communication with the atmosphere in the event of an undue reduction in fluid pressure within the slide part.

The above and other features and objects of the present invention will be better understood from the following description of the typical embodiments illustrated in the accompanying drawing in which:

FIG. 1 is a side view representing a distribution valve system embodying the invention, as used in a sprinkling or watering system;

FIG. 2 is an enlarged fragmentary axial or vertical section through the valve of FIG. 1, and showing the valve in one of its opened positions;

FIG. 3 is a fragmentary view similar to the upper portion of FIG. 2, but showing the slide valve in its fully closed position;

FIG. 4 is a fragmentary elevational view representing the elongated slot formed in the slide part;

FIG. 5 is a greatly enlarged vertical or axial section through the anti-siphon valve, taken on line 5—5 of FIG. 1;

FIG. 6 is a fragmentary view taken on line 6—6 of FIG. 5; and

FIG. 7 is a view representing a variational form of the invention, in which the slide valve extends horizontally instead of vertically.

Referring first to FIGS. 1 through 6, and particularly to FIG. 1, I have shown at 10 a distribution valve embodying the invention as it appears when connected into a lawn or garden watering system. The line 11 represents the main water supply line through which water under pressure is supplied to the valve or distribution unit 10, for delivery ultimately through separate branch lines 12 to a number of different groups of sprinklers or outlets for watering different portions of the lawn or garden. Supply line 11 may be a conventional metal pipe, projecting upwardly beyond the surface of the earth 13, and carrying an upper horizontally projecting length 14 of typically metal pipe at a location spaced well above the earth. Supply pipe 14 threadedly connects into an inlet fitting 15 of unit 10, to deliver water through the unit to this fitting. The lines 12 leading from unit 10 to the different groups of sprinklers (represented at 16 in FIG. 2) may be plastic pipes or tubing, preferably formed of polyvinyl chloride.

Referring now particularly to FIG. 2, slide valve unit 10 may include an outer tube 17 forming the body of the valve, and an inner tube 18 serving as the slide element. In the arrangement illustrated, tubes 17 and 18 are straight cylindrical tubes, centered about a common vertical axis 19. Inner tube 18 is a relatively close fit within outer body section or tube 17, to be effectively guided by the outer tube for vertical sliding movement along axis 19 relative to outer tube 17. Slide element 18 is closed at its lower end, as by a cap screw 20 screwed onto external threads 21 of part 18. The upper end of tube 18 is closed, when water is being delivered through the unit 10, by an anti-siphon valve 22, which will be described in greater detail at a later point.

Inlet fitting 15 may have internal threads 23 into which the externally threaded end of supply pipe 14 is connected. The opposite end of fitting 15 may be somewhat reduced in diameter, typically to an external diameter the same as that of lines 12 leading to the sprinklers.

The drawings represent an arrangement in which there are six discharge lines 12 leading from the valve unit 10, with these six lines being arranged in two upper and lower groups of three each. It will be understood, however, that a greater number or a lesser number of outlets may be employed, as by reducing or increasing the number of lines in each of the groups.

Outlet lines 12 and fitting 15 may be connected to body 17 by means of individual T fittings 24, 25, 26, 27, 28, 29 and 30. These fittings may be identical, each having a bore 31 within which tubular body 17 is received in close fitting relation. Projecting transversely of bore 31 and axis 19, fittings 24 through 30 have individual tubular connector portions 32, centered about individual horizontal axes 33 extending perpendicular to main vertical axis 19. Laterally projecting tubular portions 32 of the various fittings 24 through 30 have inner bores 34 within which pipes 12 and reduced diameter portion 35 of fitting 15 are receivable in closely fitting relation.

All of the parts 15, 17, 18, 20 and 24 through 30 may be formed of a resinous plastic material, preferably polyvinyl chloride, and be solvent welded or otherwise cemented together at locations where rigid fluid-tight joints are desired. For example, the inner bores 31 of the various fittings 24 through 30 may be coated with a solvent which will dissolve polyvinyl chloride, before these parts are slipped onto tube 17, so that the solvent will temporarily dissolve the inner surfaces of bores 31 and the engaging outer surface of tube 17, to tightly fuse these parts together in a manner preventing any leakage of fluid axially between the parts. Similarly, the ends of tubes 12 and end 35 of fitting 15 may be externally coated with solvent before insertion into portions 32 of the fittings, to form annular fluid-tight joints with these fittings. Part 15 is formed separately from part 30 in order that part 15 may first be screwed onto the metal pipe 14 by itself, and the rest of the unit may then be easily solvent welded to element 15. Any conventional known solvent may be employed as the bonding material.

The various fittings 24 through 30 communicate with the interior of tubes 17 through a series of individual openings 36, 37, 38, 39, 40, 41 and 42, respectively, formed in the side wall of tube 17. The first three of these apertures, numbers 36 through 38, may be aligned vertically at one side of tube 17, while the next three apertures 39 through 41, may be aligned vertically at the diametrically opposite side of tube 17. The final aperture 42, communicating with inlet fitting 15, may be in vertical alignment with apertures 39 through 41, but spaced a substantial distance thereabove.

For passing water from aperture 42 to the interior of slide element 18, part 18 contains in its side wall a vertically extending slot 43 (see FIGS. 2 and 4). Projecting into this slot at a location beneath aperture 42, tube 17 carries a guide pin 44, which may be received and rigidly retained within an aperture in the side wall of tube 17. Pin 44 may be formed of any suitable rigid and strong material, such as a metal or a short length of rigid polyvinyl chloride rod. Element 44 may be externally cylindrical, and projects inwardly from tube 17 perpendicular to and toward axis 19. Thus, reception of pin 44 within slot 43 restrains tube 18 against more than very limited rotary movement relative to tube 17, to maintain communication between slot 43 and aperture 42 as tube 18 moves vertically. At spaced locations along the vertical extent of slot 43, the side wall of tube 18 is cut away to form a series of uniformly spaced notches 45, within which pin 44 is receivable, to releasably lock tube 18 in any of seven different settings. To move pin 44 into any of the notches 45, tube 18 is merely shifted vertically to a position in which the pin is horizontally opposite that particular notch, and the tube is then turned slightly to cause reception of the pin in the notch. The spacing X between successive notches 45 is desirably equal to one-half of the spacing Y between the axes 33, and apertures 36 through 41 associated with fittings 24 through 29 respectively, in order that the various settings in which element 18 may be locked in position will correspond to predetermined settings for delivering water to the different outlet lines. As will be apparent from FIGS. 2 and 4, slot 43 terminates at locations slightly higher than and slightly lower than the uppermost and lowermost notches 45, to thereby limit the range of vertical movement of inner slide 18.

For admitting water from the interior of tube 18 into the upper three outlet fittings 27, 28, and 29, tube 18 has an aperture 46, and carries two vertically spaced rubber O-rings 47 in external grooves above and beneath aperture 46 to form water-tight annular seals with tubes 17 at those locations. Similarly, for providing communication between the interior of tube 18 and the lower three fittings 24, 25 and 26, tube 18 has another aperture 48, packed off by rubber O-rings or seal rings 49 carried in external grooves in part 18 and engageable with the inner surface of tube 17. At a location above slot 43, slide 18 has two additional rubber O-rings 50', received in external grooves in tube 18 and forming two vertically spaced annular seals with tube 17, for a purpose later to be described.

Tube 18 projects upwardly and downwardly beyond the extremities of outer tube 17. In the uppermost position of element 18 (see FIG. 2) tube 18 projects a very substantial distance above tube 17, while in the lowermost position (FIG. 3), the anti-siphon unit 22 mounted on the upper end of tube 18 may be received very near the upper end of tube 17. To indicate to a user when the part 18 is in one of its seven different adjusted settings, in which settings pin 44 is located opposite the various notches 45 respectively, tube 18 carries seven vertically spaced markings 50, typically taking the form of horizontal lines, as shown. These lines may be marked "closed", "number 1", "number 2", etc. When any of these lines 50 is received in direct horizontal alignment with the upper edge 51 of tube 17, this advises the user that the valve is then in a predetermined indicated one of the seven different settings. The upwardly projecting portions of tube 18, and the carried anti-siphon unit 22, serve as a handle for easily shifting element 18 between its various settings.

To now describe the anti-siphon unit represented in FIGS. 5 and 6, it is noted that this unit includes a tubular connector fitting or coupling 52, centered about axis 19 and solvent welded to the upper end of tube 18. Threadedly connected into the upper end of part 52, there is provided an anti-siphon valve body part 53, taking the form of a tube having an inner cylindrical bore 54. An externally cylindrical plug 55 is connected into the upper end of tube 53, and an internally cylindrical cap 56 extends about the upper end of tube 53. All of the parts 52, 53, 55 and 56 may be formed of polyvinyl chloride, and be tightly solvent welded together. A vertical bore or passage 57 extends upwardly along axis 19 through parts 55 and 56, and a communicating lateral vent passage 58 extends horizontally from passage 57 through parts 55, 53, and 56.

Confined between the lower end of tube 53 and a shoulder formed in part 52, there is provided an annular washer or ring 59, on which the movable element 60 of the anti-siphon valve rests when there is no water pressure within element 18. Part 60 is externally cylindrical, except at locations at which a number of circularly spaced vertically extending axial grooves 61 are formed in the outer surface of element 60, to pass water upwardly past this part. Similar grooves 62 and 63 extend across the under side of part 60, at right angles to one another, and communicate at their outer extremities with grooves 61 so that air may flow across the under side of part 60 from grooves 61 even though element 60 is resting on washer 59. Projecting upwardly from the center of part 60, there is a vertically extending essentially rigid rod 64, whose lower end may be threaded or otherwise connected into element 60 at 65, and which projects upwardly through passage 57. Rod 64 is an indicator element, which may be colored differently than the other parts (typically red), and which in the lowermost position of element 60 (when this part 60 rests on washer 59) has its upper extremity 66 substantially flush or horizontally aligned with the top surface 67 of cover 56. When valve 60 is actuated upwardly, the indicator element 64 projects upwardly above cover 56 to indicate that the anti-siphon valve is closed.

The seat for the anti-siphon valve 60 takes the form of an annular upwardly flaring surface 68 formed at the bottom of part 55. For engagement with this surface, element 60 carries a rubber O-ring 69, or other seal element, received within a groove formed about rod 64, and annularly engageable with surface 68 about the rod.

To now describe the manner of operation of the unit shown in FIGS. 1 through 6, assume first of all that slide valve element 18 is in its lowermost position, represented in FIG. 3. In this setting, the uppermost indicator line 50, marked "closed," is aligned with the upper edge of tube 17, to indicate that the slide valve is in its fully closed position. As will be apparent from FIG. 3, the reception of the two seal rings 50 above and beneath fluid inlet aperture 42, in the closed condition of the valve, positively prevents any flow of water from the inlet and into and past tube 18. While the main slide valve is in closed condition, anti-siphon valve element 60 of FIG. 5 is of course retained by gravity in its lowermost opened position, in which it allows free communication between the interior of tube 18 and the atmosphere. It is also noted that, in the FIG. 3 closed setting of the slide valve, the lower end portion of slot 43 in tube 18 may be in communication with the uppermost outlet aperture 41 of tube 17.

If it is desired to admit water to a first of the branches of the sprinkler system, the operator grasps anti-siphon unit 22 at the upper end of tube 18, and using this anti-siphon unit as a handle pulls tube 18 upwardly through the distance X of FIG. 4, to reach a setting in which the next successive line 50 is aligned with upper edge 51 of tube 17. This moves aperture 48 into registry with aperture 36 (see FIG. 2), and moves an upper portion of slot 43 in communication with aperture 42, so that water may flow through aperture 42 and slot 43 into the interior of tube 18, and then through aperture 43 and aperture 36 into the lowermost discharge line 12. In this setting, aperture 46 and its seal rings 47 are located slightly beneath aperture 39, and therefore do not admit water into any of the upper three outlet tubes 12. The valve element may be locked in this position, or in any other of its seven predetermined positions, including the previously discussed closed setting, by merely turning element 18 until pin 44 is received within the appropriate notch 45. It is noted that the diameters of the various registering apertures 36 through 42, 46 and 48, as well as the width of slot 43, and the depth of notches 45, are such as to maintain the water delivering communication through the various mating apertures and slot 43 when pin 44 is received within any of the notches 45, and also when element 18 is turned slightly to move the pin out of the notch (but leaving element 18 at the same vertical setting). Preferably, the most open communication through the apertures and slot is attained when pin 44 is in notches 45.

We have described above actuation of element 18 upwardly from the FIG. 3 fully closed position to the first open position of the valve, in which water is delivered to the lowermost discharge fitting 24. From this setting, element 18 may be shifted upwardly to the next successive marking 50, and then turned to retain the valve in that next setting, in which aperture 46 communicates with aperture 39, while aperture 48 is located between, and sealed from, apertures 36 and 37. Thus, water is delivered to discharge fitting 27 and the connected sprinklers or outlets. Movement upwardly to the next successive fitting brings aperture 48 into communication with outlet 37, and moves aperture 46 between apertures 39 and 40. In the next setting, aperture 46 communicates with aperture 40, while aperture 48 is between apertures 37 and 38. The next setting brings aperture 48 into communication with aperture 38, and moves aperture 46 between apertures 40 and 41. In the next successive setting, aperture 46 communicates with aperture 41, while aperture 48 is above and sealed from aperture 38. This is the uppermost FIG. 2 setting of the valve, and admits water to outlet 29. Thus, there are six open settings, for delivering water to the six outlets respectively. If more or fewer outlets are desired, then the spacing of the apertures, etc., is merely changed to accommodate that altered number of outlets.

Whenever slot 43 is in communication with aperture 42, and water under pressure is therefore admitted to the interior of tube 18, the pressure acts upwardly against valve element 70 to shift that element upwardly to its closed position in which seal ring 69 engages seat 68. Thus, element 70 acts as a check valve which prevents water under pressure from escaping from the interior of tube 18 through the anti-siphon unit. If, however, the water pressure from supply line 11 decreases to an unsafe value relative to atmospheric pressure, which value might cause reverse siphoning flow of fluid from unit 10 into the water supply system 11, the reduction of pressure within tube 18 causes valve element 60 to fall downwardly onto ring 59, and in that way open a vent through passages 57 and 58, and grooves 61, 62 and 63, through which air from atmosphere may flow through the anti-siphon unit to the interior of tube 18. This automatic opening of an anti-siphon venting communication with the atmosphere prevents reverse flow of water, or perhaps fertilizer or poison injected into the water, from any of the lines 12 into line 11. As soon as normal water pressure is again restored, that pressure of course reactuates element 60 to its closed position, to prevent unwanted escape of water through the anti-siphon unit. Indicator element 66 indicates to the operator whether the anti-siphon is, at any particular time, open or closed.

FIG. 7 represents a slightly variational form of the invention, which may be considered as identical with that of FIGS. 1 through 6, except that the slide valve unit 10a (corresponding to unit 10) extends horizontally rather than vertically, with the anti-siphon unit 22a (corresponding to unit 22 of FIGS. 1 through 6), being connected to slide valve element 18a by means of an elbow 70, so that anti-siphon unit 22a may project upwardly, at an angle to the main axis of the slide valve. The structure is connected to a water inlet line 11a corresponding to lines 11 and 14 of FIG. 1. As in the first form of the invention, the projecting ends of slide 18a and anti-siphon unit 22a serve as handles for actuating the device between its various different settings. Except as to the horizontal shiftability of the slide valve element, rather than its vertical movement as in the first form of the invention, the operation of the FIG. 7 device is identical with that of FIGS. 1 through 6.

It is noted that the slide valve of the present apparatus is an inherently balanced type of valve, in which the fluid pressure within the slide element tends to actuate the slide equally in both axial directions, and therefore will not displace the slide from any of its various settings.

While body type 17 has been illustrated as formed separately from fittings 24 through 30, it is contemplated that, if desired, these parts may all be molded integrally, as a single unitary part.

If it is desired to inject an insecticide, fertilizer, or other treating chemical into the water as it passes through the valve unit of FIG. 1, this may be done by feeding the chemical in liquid, solid or gaseous form into tubes 17 and 18 through a T fitting 80 connected to tube 17 just below fitting 15. The chemical may be pumped into the system by any convenient supply unit, typically represented at 81, which unit may for example be a metering pump for supplying the liquid at a metered rate and at a pressure somewhat above that of the water supplied by line 11. Fitting 80 communicates with an opening 82 in tube 18, which opening communicates with slot 43 in all settings of the valve to feed the treating chemical therethrough. When it is not desired to inject a treating chemical ino the water, the line leading to fitting 80 from unit 81 may be closed by a valve 83.

I claim:

1. A valve comprising an elongated essentially tubular valve body, a first fitting on said valve body communicating with the interior thereof at a predetermined location, a plurality of second fittings on said valve body communicating with its interior at different locations, and an elongated slide valve element taking the form of a tube extending axially within said body and movable axially relative thereto, said slide valve tube having apertures in its sidewall communicable with said first and second fittings to place the first fitting in communication with different second fittings selectively in different settings of said slide valve tube, said slide valve tube having an end portion projecting axially beyond said body and forming a handle accessible to an operator by which the tube is manually shiftable between said different settings, said apertures, including an elongated slot in the tube side wall communicable with said first fitting in a plurality of said different settings and through which fluid flows between said first fitting and the interior of said tube, and a locating part carried by said body and projecting into said slot and engageable with the tube adjacent the slot to limit movement of the tube relative to said body.

2. A valve comprising an elongated essentially tubular valve body, a first fitting on said valve body communicating with the interior thereof at a predetermined location, a plurality of second fittings on said valve body communicating with its interior at different locations, an elongated slide valve element taking the form of a tube extending axially within said body and movable axially relative thereto, said slide valve tube having apertures in its side wall communicable with said first and second fittings to place the first fitting in communication with different second fittings selectively in different settings of said slide valve tube, said slide valve tube having an end portion projecting axially beyond said body and forming a handle accessible to an operator by which the tube is manually shiftable between said different settings, said apertures including an elongated slot in the tube side wall communicable with said first fitting in a plurality of said different settings and through which fluid flows between said first fitting and the interior of said tube, a locating part carried by said body and projecting into said slot and engageable with the tube adjacent the slot to limit movement of the tube relative to said body, the wall of said tube forming notches projecting laterally from said slot at axially spaced locations for receiving said locating part to retain the tube in different settings thereof.

3. A valve comprising an elongated essentially tubular valve body, a first fitting on said valve body communicating with the interior thereof at a predetermined location, a plurality of second fittings on said valve body communicating with its interior at different locations, an elongated slide valve element taking the form of a tube extending axially within said body and movable axially relative thereto, said slide valve tube having apertures in its sidewall communicable with said first and second fittings to place the first fitting in communication with different second fittings selectively in different settings of said slide valve tube, said slide valve tube having an end portion projecting axially beyond said body and forming a handle accessible to an operator by which the tube is manually shiftable between said different settings, said apertures including aperture means in the tube wall registrable with said second fittings selectively in different settings of the tube, and including an elongated slot in the tube communicable with said first fitting in a plurality of said different settings, a locating part carried by said body and projecting into said slot to limit movement of the tube relative to said body, said slot forming laterally projecting notches at axially spaced locations for receiving said locating part to retain the tube in different settings thereof, and an anti-siphon check valve carried by and movable with said end portion of the slide valve tube and operable to pass fluid into the tube from the atmosphere but preventing fluid flow in a reverse direction, said anti-siphon check valve being communicable through the interior of said inner tube and said aperture with said first fitting and with said second fittings selectively to prevent back siphoning therefrom.

4. A valve comprising an elongated essentially tubular valve body, a first fitting on said valve body communicating with the interior thereof at a predetermined location, a plurality of second fittings on said valve body communicating with its interior at different locations, and an elongated slide valve element extending axially within said tubular body and movable axially relative thereto, there being passages in said element for placing said first fitting in communication selectively with different ones of said second fittings in different settings of the slide valve element, said passages including an axially elongated passage formed in said element and through which fluid flows in passing from said first fitting to said second fittings, there being a locating part carried by said body and projecting into said elongated passage and engageable with said element adjacent said passage to limit movement of said element, the material of said element forming notches extending laterally from said passage at spaced locations for receiving said locating part to retain said element in different settings thereof.

5. A garden watering valve comprising an inner tube, an outer tube disposed about said inner tube, one of said tubes being movable axially relative to the other, a fluid inlet for feeding water to said tubes, a plurality of outlets communicating with said outer tube at different locations, said outer tube having an opening in its side wall communicating with said inlet, said inner tube having an elongated slot communicating with said opening in different relative settings of the tubes, said inner tube being apertured to communicate selectively with said different outlets in said different relative settings of the tubes to thereby selectively place said different outlets in communication with said inlet, said outer tube having openings in its side wall through which said inner tube communicates with said outlets respectively and means for feeding a treating liquid to said tubes, separately from the water, and at a location to mix with the water and be discharged therewith through said outlets, said last mentioned means including an additional opening in the side wall of said outer tube for feeding said liquid into the tubes and communicating with said slot.

6. A garden watering valve comprising an inner tube, an outer tube disposed about said inner tube, one of said tubes being movable axially relative to the other, a fluid inlet for feeding water to said tubes, a plurality of outlets communicating with said outer tube at different locations, said outer tube having an opening in its side wall communicating with said inlet, said inner tube having a side wall containing aperture means communicating with said opening in a plurality of different relative axial settings of the tubes to place said inlet in communication with the interior of said inner tube in each of said settings, said side wall of said inner tube containing additional aperture means positioned to communicate selectively with said different outlets in said different relative settings of the tubes to thereby selectively place said different outlets in communication with said inlet, said outer tube having openings in its side wall through which said inner tube communicates with said outlets respectively and means for feeding a treating liquid to the interior of said inner tube, separately from the water, and at a location to mix with the water and be discharged therewith through said outlets.

7. A garden watering valve comprising an inner tube, an outer tube disposed about said inner tube, one of said tubes being movable axially relative to the other, a fluid inlet for feeding water to said tubes, a plurality of outlets communicating with said outer tube at different locations, said outer tube having an opening in its side wall communicating with said inlet, said inner tube having a side wall containing aperture means communicating with said opening in a plurality of different relative axial settings of the tubes to place said inlet in communication with the interior of said inner tube in each of said settings, said side wall of said inner tube containing additional aperture means positioned to communicate selectively with said different outlets in said different relative settings of the tubes to thereby selectively place said different outlets in communicaion with said inlet, said outer tube having openings in its side wall through which said inner tube communicates with said outlets respectively and means for feeding a treating liquid to the interior of said inner tube, separately from the water, and at a location to mix with the water and be discharged therewith through said outlets, said last mentioned means including a second inlet and an additional opening in the side wall of said outer tube communicating therewith for feeding said liquid into the tubes and communicating with said first mentioned aperture means in a plurality of said different settings.

8. A valve comprising an elongated essentially tubular valve body, a first fitting on said valve body communicating with the interior thereof at a predetermined location, a plurality of second fittings on said valve body communicating with its interior at different locations, and an elongated slide valve inner tube extending axially within said tubular body and movable axially relative thereto, there being apertures in the side wall of said inner tube registrable with said first fitting and with said different second fittings selectively, for placing said first fitting in communication selectively with different ones of said second fittings in different settings of the inner tube, and an anti-siphon check valve carried by and movable with an end of said inner tube and communicating with the interior thereof and operable to automatically open a vent to the interior of said inner tube upon a reduction in pressure therein, said anti-siphon check valve being communicable through the interior of said inner tube and said apertures in the side wall thereof with said first fitting and with said second fittings selectively to prevent back siphoning therefrom.

References Cited in the file of this patent

UNITED STATES PATENTS

| | | |
|---|---|---|
| 1,791,312 | Hegyes | Feb. 3, 1931 |
| 2,004,455 | Woolley | June 11, 1935 |
| 2,080,760 | Condon | May 18, 1937 |
| 2,164,622 | Podolsky | July 4, 1939 |
| 2,521,119 | Green | Sept. 5, 1950 |
| 2,528,791 | Scoville | Nov. 7, 1950 |
| 2,741,258 | Bletcher | Apr. 10, 1956 |
| 2,754,820 | Gluck | July 17, 1956 |
| 2,924,243 | Cordova | Feb. 9, 1960 |
| 3,026,904 | Dollison | Mar. 27, 1962 |